(12) United States Patent
Mitsumori

(10) Patent No.: US 12,027,147 B2
(45) Date of Patent: Jul. 2, 2024

(54) MUSICAL PERFORMANCE DEVICE AND NON-TRANSITORY COMPUTER READABLE STORAGE MEDIUM STORING MUSICAL PERFORMANCE PROGRAM

(71) Applicant: Roland Corporation, Shizuoka (JP)

(72) Inventor: Makoto Mitsumori, Shizuoka (JP)

(73) Assignee: Roland Corporation, Shizuoka (JP)

( * ) Notice: Subject to any disclaimer, the term of this patent is extended or adjusted under 35 U.S.C. 154(b) by 579 days.

(21) Appl. No.: 17/315,384

(22) Filed: May 10, 2021

(65) Prior Publication Data

US 2021/0350780 A1    Nov. 11, 2021

(30) Foreign Application Priority Data

May 11, 2020  (JP) ................................ 2020-082995

(51) Int. Cl.
| | | |
|---|---|---|
| *G10H 1/00* | (2006.01) | |
| *G06F 3/04845* | (2022.01) | |
| *G06F 3/04886* | (2022.01) | |
| *G10D 13/02* | (2020.01) | |
| *G10H 1/08* | (2006.01) | |

(52) U.S. Cl.
CPC ....... *G10H 1/0066* (2013.01); *G06F 3/04845* (2013.01); *G06F 3/04886* (2013.01); *G10D 13/02* (2013.01); *G10H 1/08* (2013.01); *G10H 2220/096* (2013.01); *G10H 2220/106* (2013.01); *G10H 2250/435* (2013.01)

(58) Field of Classification Search
None
See application file for complete search history.

(56) References Cited

U.S. PATENT DOCUMENTS

| | | | | |
|---|---|---|---|---|
| 6,127,617 A | * | 10/2000 | Suzuki | G10H 1/08 |
| | | | | 84/625 |
| 8,816,180 B2 | * | 8/2014 | Georges | G10H 1/0025 |
| | | | | 84/622 |
| 10,224,888 B1 | * | 3/2019 | Kira | G10H 1/06 |

(Continued)

FOREIGN PATENT DOCUMENTS

JP    2013257517    12/2013

OTHER PUBLICATIONS

"Summons to attend oral proceedings of Europe Counterpart Application", issued on Sep. 19, 2022, pp. 1-7.

(Continued)

*Primary Examiner* — Toan H Vu
(74) *Attorney, Agent, or Firm* — JCIPRNET

(57) ABSTRACT

A storage medium storing a musical performance program and a musical performance device are provided. A musical sound is output through a clicking operation performed on an operation button, and a tone parameter is changed through a dragging operation. A parameter display part 6a is displayed on the operation button. When the musical sound is output through a clicking operation performed on the operation button, a user can recognize a state of the tone parameter of the output musical sound in advance through the parameter display part. Since the tone parameter set through a dragging operation performed on the operation button is reflected to the parameter display part, the tone parameter is recognized without looking away from the operation button.

14 Claims, 8 Drawing Sheets

(a)

(b)    (c)

(56) References Cited

U.S. PATENT DOCUMENTS

| | | | |
|---|---|---|---|
| 2001/0009570 A1* | 7/2001 | Knox | G06F 3/04847 |
| | | | 375/259 |
| 2007/0088698 A1* | 4/2007 | Hatsumi | G06F 16/68 |
| 2012/0247307 A1* | 10/2012 | Nakagawa | G10H 1/46 |
| | | | 84/622 |
| 2014/0287397 A1* | 9/2014 | Chong | G09B 5/12 |
| | | | 434/350 |
| 2016/0027160 A1* | 1/2016 | Aydin | G06T 5/50 |
| | | | 382/162 |
| 2016/0099009 A1* | 4/2016 | Kim | H04S 7/307 |
| | | | 381/17 |
| 2017/0090862 A1 | 3/2017 | Suzuki et al. | |
| 2018/0182364 A1* | 6/2018 | Sakata | G10H 1/0008 |
| 2018/0240447 A1 | 8/2018 | Baker et al. | |
| 2019/0096373 A1* | 3/2019 | Setoguchi | G10H 1/46 |
| 2019/0103080 A1 | 4/2019 | Decker et al. | |

OTHER PUBLICATIONS

"Search Report of Europe Counterpart Application", issued on Oct. 5, 2021, pp. 1-8.

Office Action of European Counterpart Application, issued on Apr. 8, 2022, pp. 1-5.

"Notice of Reasons for Refusal of Europe Counterpart Application", issued on Apr. 5, 2023, p. 1-p. 22.

* cited by examiner (a)

(b)

(c)

(a)

(b)             (c)

(d)             (e)

MUSICAL PERFORMANCE DEVICE AND NON-TRANSITORY COMPUTER READABLE STORAGE MEDIUM STORING MUSICAL PERFORMANCE PROGRAM

CROSS REFERENCE TO RELATED APPLICATIONS

This application claims the priority benefit of Japanese Patent Application No. 2020-082995, filed on May 11, 2020. The entirety of the above-mentioned patent application is hereby incorporated by reference herein and made a part of this specification.

BACKGROUND

Technical Field

The present disclosure relates to a storage medium storing a musical performance program and a musical performance device.

Description of Related Art

Patent Document 1 discloses a program that displays a virtual keyboard A that simulates a keyboard and virtual knob operators B that simulate knobs. The program is adapted such that corresponding musical sounds are output if a key of the virtual keyboard A is touched and a tone parameter of the musical sound is changed if a virtual knob operator B is operated. Further, a tone parameter of the musical sound output by a key of the virtual keyboard A may be changed by touching a key and then performing a sliding operation on (dragging) the key. In this manner, it is possible to change a tone parameter of musical sound output by a key without operating the virtual knob operators B by performing a sliding operation on a key of the virtual keyboard A.

PATENT DOCUMENTS

[Patent Document 1] Japanese Patent Laid-Open No. 2013-257517 (Paragraphs 0024, 0025, and FIG. 2, for example)

However, according to the program in Patent Document 1, a change of state is reflected only in the virtual knob operators B in a case in which a tone parameter is changed through a sliding operation performed on a key of the virtual keyboard A. Therefore, since it is necessary for a user to look at the virtual knob operators B while operating the keys of the virtual keyboard A in order to check a change of state of a tone parameter at the time of outputting a tone through touching of the virtual keyboard A and at a time of changing a tone parameter through a sliding operation performed on a key of the virtual keyboard A, there is a problem that the operability thereof is degraded.

The disclosure was made in order to solve the aforementioned problem and provides a musical performance program and a musical performance device in which the operability thereof is able to be improved in a case in which a function of outputting musical sound and a function of changing a tone parameter of musical sound are assigned to operation buttons.

SUMMARY

According to an embodiment of the disclosure, there is provided a storage medium storing a musical performance program that causes a computer provided with a display part and an input part that receives an operation of a user to execute a musical performance process, the musical performance program causing the computer to execute: a displaying step of displaying an operation button on the display part; an inputting step of inputting the operation of the user from the input part; an outputting step of outputting a musical sound assigned to the operation button through a first operation input to the operation button in the inputting of the operation; a changing step of changing a tone parameter of the musical sound assigned to the operation button through a second operation that is different from the first operation input to the operation button in the inputting step of the operation; and a parameter display step of displaying, inside the operation button, the tone parameter of the musical sound assigned to the operation button.

According to an embodiment of the disclosure, there is also provided a musical performance device including: a display section that displays an operation button; an input section to which an operation of a user is input; an output section that outputs a musical sound assigned to the operation button through a first operation input to the operation button using the input section; a changing section that changes a tone parameter of the musical sound assigned to the operation button through a second operation that is different from the first operation input to the operation button using the input section; and a parameter display section that displays, inside the operation button, the tone parameter of the musical sound assigned to the operation button.

DESCRIPTION OF THE EMBODIMENTS

Figure 1:
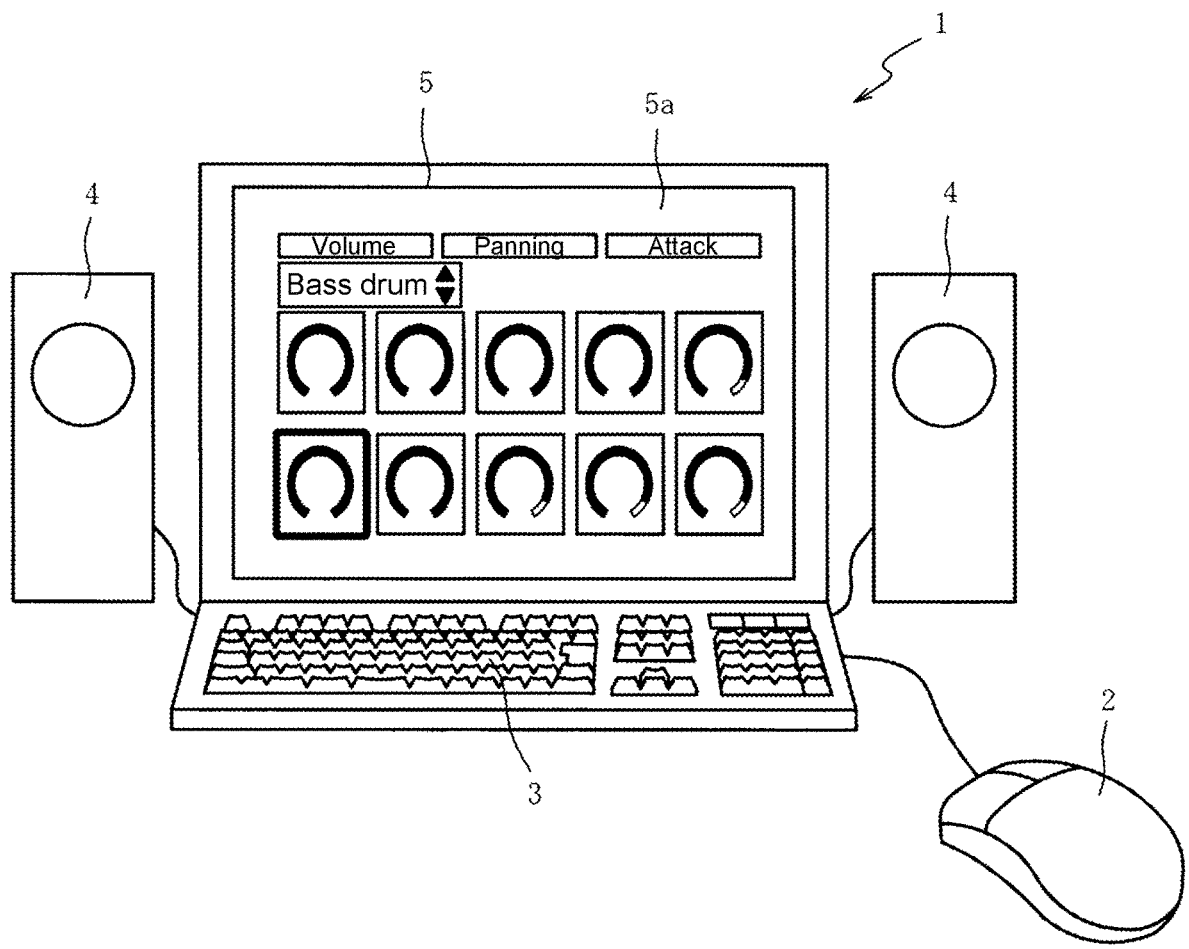
FIG. 1 is an appearance diagram of a PC.

Hereinafter, preferable embodiments will be described with reference to the accompanying drawings. Referring to FIG. 1, an overview of a PC 1 according to the present embodiment will be described. FIG. 1 is an appearance diagram of the PC 1. The PC 1 is an information processing device (computer) that outputs musical sounds in response to musical performance operations of a user H who is a player, or a reproduction of musical performance data (MIDI data, for example) and the like. The PC 1 is provided with a mouse 2 and a keyboard 3 through which commands from the user H are input, a speaker 4 that outputs musical sound, and a display device 5 that displays a musical performance screen 5a, which will be described later, and the like.

Figure 2:
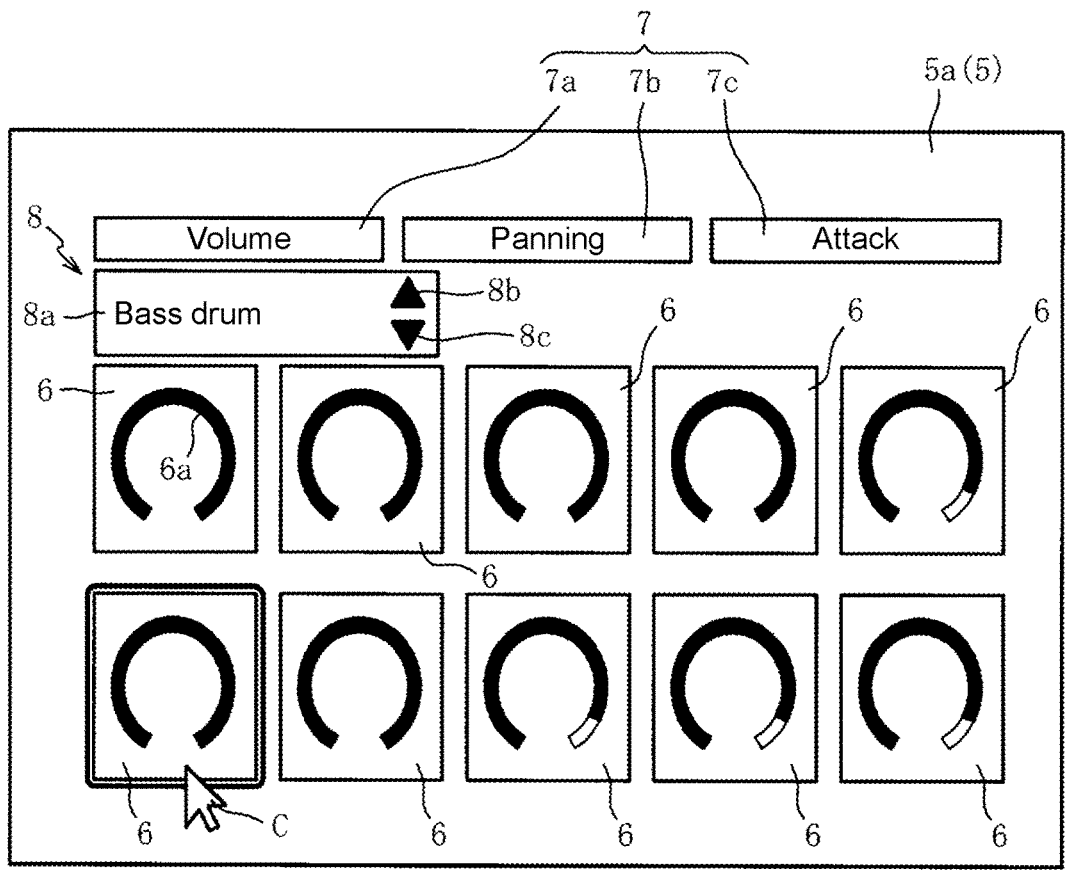
FIG. 2: (a) of FIG. 2 is a diagram representing a musical performance screen in an ordinary musical performance mode, (b) of FIG. 2 is a diagram representing an operation button before a parameter is changed, and (c) of FIG. 2 is a diagram representing the operation button after the parameter is changed on a parameter display part.
Figure 2:
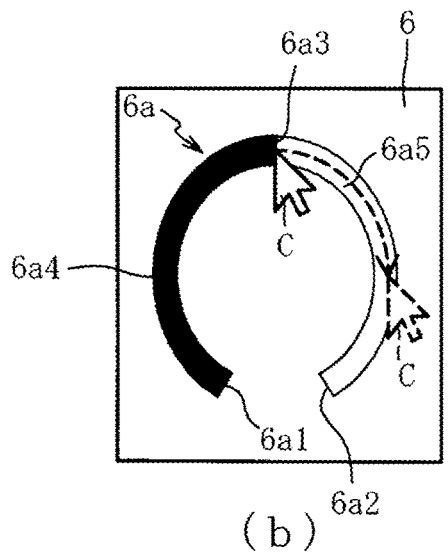
Figure 2:
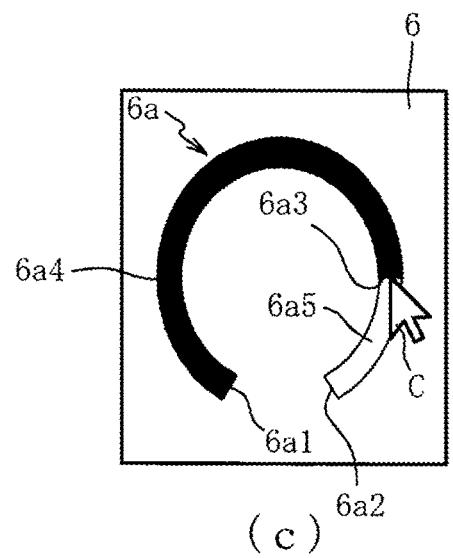
Figure 3:
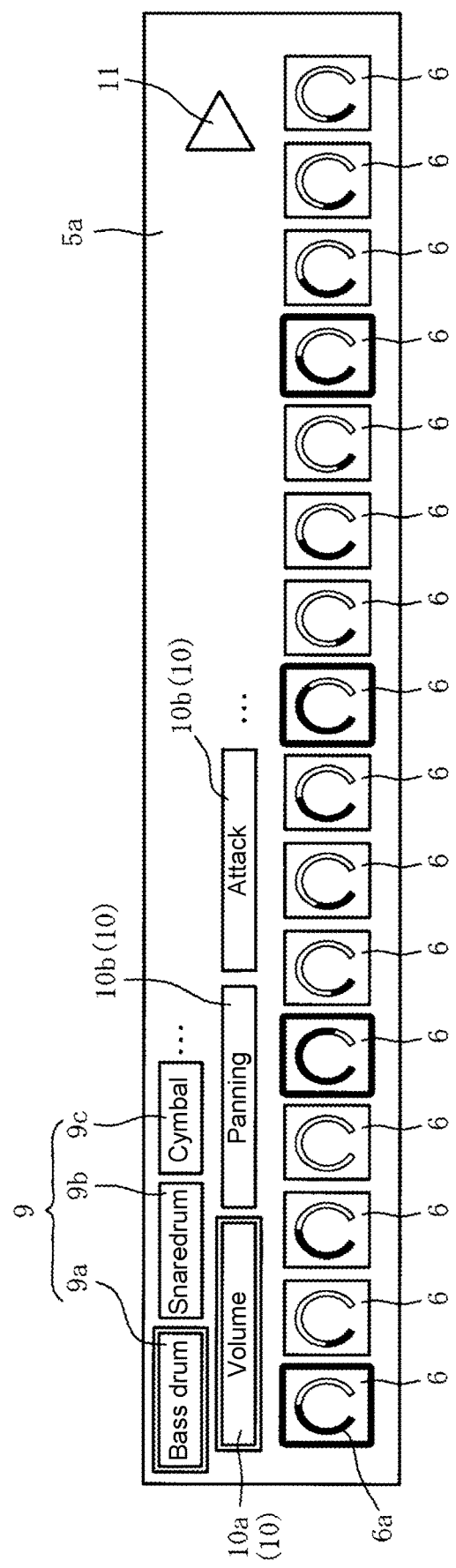
FIG. 3 is a diagram illustrating the musical performance screen in a step musical performance mode.

The PC 1 is provided with two "musical performance modes", namely an "ordinary musical performance mode" in which musical sounds in accordance with musical performance operations of the user H are output and a "step musical performance mode" in which an automatic musical performance is given by outputting musical sounds set in a predetermined order of sound emission timings in advance. The display device 5 displays the musical performance screen 5a that is a screen in accordance with the ordinary musical performance mode or the step musical performance mode. Referring to FIG. 2 and FIG. 3, the musical performance screen 5a in each musical performance mode will be described.

(a) of FIG. 2 is a diagram representing the musical performance screen 5a in the ordinary musical performance mode. In the ordinary musical performance mode, operation buttons 6, a parameter selection area 7, and a tone area 8 are displayed in the musical performance screen 5a displayed on the display device 5. The operation buttons 6 are ten rectangular buttons displayed at the center to the lower part of the musical performance screen 5a.

A tone of a bass drum, a snare drum, a cymbal or the like is assigned to each of the operation buttons 6, and in a case in which a clicking operation (selecting operation; first operation) is performed with a mouse cursor C that moves through an operation performed by the user H on the mouse 2 located on the operation button 6, musical sound assigned to the operation button 6 is output. At that time, an outline of the operation button 6 on which the clicking operation has been performed is displayed in an emphasized manner as illustrated in the left lower operation button 6 in (a) of FIG. 2.

A parameter display part 6a representing a setting state of a tone parameter such as a volume and panning of musical sound assigned to the operation button 6 is displayed at the center of the operation button 6. Referring to (b) and (c) of FIG. 2, the parameter display part 6a will be described.

(b) of FIG. 2 is a diagram representing the operation button 6 before the tone parameter is changed using the parameter display part 6a, and (c) of FIG. 2 is a diagram representing the operation button 6 after the tone parameter is changed using the parameter display part 6a. As illustrated in (b) and (c) of FIG. 2, the parameter display part 6a displays a setting state of a tone parameter of the musical sound assigned to the operation button 6, which is a tone parameter selected in the parameter selection area 7 that will be described later. In the present embodiment, the parameter display part 6a is displayed in an arc shape (horseshoe shape) projecting upward. In the parameter display part 6a illustrated in (b) and (c) of FIG. 2, a left end part 6a1 of the arc shape represents a minimum value of the tone parameter while a right end part 6a2 represents a maximum value of the tone parameter.

The parameter display part 6a displays a current position 6a3 that is a position corresponding to a current setting value of the tone parameter, and a first area 6a4 that is an area from the current position 6a3 to the left end part 6a1 and a second area 6a5 that is an area from the current position 6a3 to the right end part 6a2 are displayed in mutually different forms (with different colors, patterns, or the like, for example). In this manner, it is possible to recognize a difference between the minimum value of the tone parameter and the current setting value and a difference between the current setting value and the maximum value of the tone parameter at a glance by checking the lengths of the first area 6a4 and the second area 6a5.

The setting of the corresponding parameter is changed by further performing a dragging operation (second operation) on the parameter display part 6a via the mouse 2. Specifically, the mouse cursor C displayed at a position in accordance with an operation of the mouse 2 is made to be located inside the parameter display part 6a, and a dragging operation is started from that position as a start point toward the left end part 6a1 or the right end part 6a2 ((b) of FIG. 2). The setting of the tone parameter is changed in accordance with the moving amount and the moving direction (toward the side of the left end part 6a1 or the side of the right end part 6a2) of the dragging operation. At this time, there is a configuration such that a change in setting of a tone parameter through a dragging operation is effective even in a case in which the mouse cursor at the start point of the dragging operation inside the parameter display parameter 6a is then moved out of the parameter display part 6a through the dragging operation. The display of first area 6a4 and the second area 6a5 in the parameter display part 6a is changed in accordance with the setting value of the tone parameter after the change of the setting.

The user H can intuitively change the setting of the tone parameter in the operation button 6 by performing the dragging operation starting from the inside of the parameter display part 6a of the operation button 6 as a start point. On the other hand, since the setting of the tone parameter is not changed in a case in which a dragging operation is started from the outside of the parameter display part 6a of the operation button 6 and in a case in which a clicking operation is performed on the parameter display part 6a, it is possible to prevent the user H from unintentionally changing the setting of the tone parameter.

Also, the moving direction of the dragging operation performed on the parameter display part 6a to change the setting of the tone parameter is not limited to toward the side of the left end part 6a1 or the side of the right end part 6a2 and may be, for example, an up-down direction or a left-right direction. In this case, a configuration may be made such that the setting value of the tone parameter increases in a case in which the dragging operation is performed in the upward direction or the rightward direction starting from the inside of the parameter display part 6a and the setting value of the tone parameter decreases in a case in which the dragging operation is performed in the downward direction or the leftward direction starting from the inside of the parameter display part 6a.

Also, it is possible to elongate the entire length of the parameter display part 6a as compared with a case in which the parameter display part 6a is linearly displayed, by the parameter display part 6a being displayed in an arc shape. In this manner, it is possible to reduce the number of setting values displayed per unit length of the parameter display part 6a and thereby to display the tone parameter in more detail, and to enable detailed setting of the tone parameter through the dragging operation. Also, the parameter display part 6a with an arc shape has a display form and an operation scheme that are similar to those of a "knob" (tab) provided in an actual musical instrument. This enables the parameter display part 6a inside the operation button 6 to be familiar for the user who uses an actual musical instrument.

The parameter selection area 7 is an area that is displayed on the upper part in the musical performance screen 5a for selecting a type of a tone parameter that is to be displayed in the parameter display part 6a in the operation button 6 to change the setting in the parameter display part 6a. The parameter selection area 7 is provided with a volume button 7a for designating a volume among tone parameters, a panning button 7b for setting a left-right position of sound, that is, a panning value among the tone parameters, and an attack button 7c for setting a tone rising time, that is, an attack value. Buttons for setting tone parameters (sustain and decay, for example) other than volume, panning, and attack may also be displayed in the parameter selection area 7.

The tone area 8 is a display area that is displayed between the operation buttons 6 and the parameter selection area 7 to select and display a tone to be assigned to each operation buttons 6. The tone area 8 is provided with a tone name display 8a that displays a name of a tone assigned to the operation button 6 displayed in an emphasized manner through a clicking operation and switching buttons 8b and 8c that are for switching the tone to be assigned to the operation button 6.

In (a) of FIG. 2, the left lower operation button 6 is displayed in an emphasized manner through a clicking operation, and "bass drum" that is a tone assigned to the operation button 6 is displayed in the tone name display 8a. The tone assigned to the left lower operation button 6 is switched to another tone of a snare drum, a cymbal, or the like from a bass drum by performing a clicking operation on the switching button 8b or 8c in this state.

As described above, the setting state of the tone parameter that is a tone parameter of the musical sound assigned to the operation button 6 and has been selected in the parameter selection area 7 is displayed in the parameter display part 6a inside the operation button 6 in the ordinary musical performance mode. When musical sound is output by performing a clicking operation on the operation button 6, the user H can recognize the state of the tone parameter of the musical sound to be output in advance by checking the parameter display part 6a in the operation button 6.

Also, the tone parameter of the musical sound assigned to the operation button 6, which has been selected in the parameter selection area 7, is changed through a dragging operation starting from the inside of the parameter display part 6a inside the operation button 6 as a start point. Since the tone parameter set through the dragging operation is reflected in the parameter display part 6a inside the operation button 6 at that time, it is possible to change the tone parameter while recognizing the setting state of the tone parameter without looking away from the operation button 6.

The types of the parameter display part 6a inside the operation button 6 and of the tone parameter, the setting of which is changed through a dragging operation starting from the inside of the parameter display part 6a as a start point, are switched through selection in the parameter selection area 7. In this manner, there is no need to display the operation button 6 for each tone and each tone parameter, and it is possible to display a necessary minimum number of operation buttons 6 on the musical performance screen 5a, thereby to improve operability of the musical performance screen 5a, and to improve space efficiency of the musical performance screen 5a.

Also, the same type of tone parameter selected in the parameter selection area 7 is displayed in each operation button 6. Therefore, it is possible to recognize a balance of the same tone parameters in the operation buttons 6 at a glance and to change the tone parameter through a dragging operation starting from the inside of the parameter display part 6a in the corresponding operation button 6 as needed. It is thus possible to easily and quickly realize a well-balanced state in which tones assigned to the operation buttons 6 are auditorily satisfactorily balanced.

Next, the step musical performance mode will be described with reference to FIG. 3. FIG. 3 is a diagram representing the musical performance screen 5a in the step musical performance mode. The step musical performance mode is a mode in which automatic musical performance is performed by setting tone parameters and the like for each predetermined sound emission timing and outputting musical sound in order of the sound emission timings using the set tone parameters. Although the sound emission timing is set to every quarter note in the present embodiment, the sound emission timing may be another timing.

A tone selection area 9, a parameter selection area 10, an automatic musical performance button 11 to execute an automatic musical performance, and the aforementioned operation buttons 6 are displayed in the musical performance screen 5a displayed on the display device 5 in the step musical performance mode. The tone selection area 9 is an area that is displayed at an upper part in the musical performance screen 5a for selecting a tone, the setting of which is to be changed using the operation button 6. A bass drum button 9a for selecting a bass drum as a setting target, a snare drum button 9b for selecting a snare drum as a setting target, and a cymbal button 9c for selecting a cymbal as a setting target are displayed in the tone selection area 9. Buttons corresponding to tones to be emitted other than the bass drum, the snare drum, and the cymbal may also be displayed in the tone selection area 9.

The parameter selection area 10 is an area that is displayed below the tone selection area 9 for selecting a tone parameter, the setting of which is to be changed using the operation button 6. A volume button 10a for selecting a volume as a setting target, a panning button 10b for selecting panning as a setting target, and an attack button 10c for selecting attack as a setting target are displayed in the parameter selection area 10. Buttons for setting tone parameters other than volume, panning, and attack may also be displayed in the parameter selection area 10.

In the step musical performance mode, sixteen operation buttons 6 are displayed below the parameter selection area 10. Tone parameters and the like at each sound emission timing are assigned in order from the operation button 6 at the left end to the operation button 6 at the right end in the musical performance screen 5a.

In the step musical performance mode, emphasized display and release of the emphasized display of the operation button 6 are alternately performed by a clicking operation of the operation button 6. The operation button 6 displayed in an emphasized manner represents that a tone selected in the tone selection area 9 at a corresponding sound emission timing is to be included in musical sound to be output, and the operation button 6 that is not displayed in an emphasized manner represents that the tone selected in the tone selection area 9 at the corresponding sound emission timing is not to be included in the musical sound to be output.

A tone parameter selected in the parameter selection area 10 of the tone selected in the tone selection area 9 is displayed in the parameter display part 6a in each operation button 6. The setting of the tone parameter selected in the parameter selection area 10 of the tone selected in the tone selection area 9 is changed through a dragging operation starting from the inside of the parameter display part 6a similarly to the aforementioned ordinary musical performance mode.

In the musical performance screen 5a in FIG. 3, for example, the bass drum button 9a in the tone selection area 9 has been selected, and the volume button 10a in the parameter selection area 10 has been selected. Whether or not to include the bass drum in the musical sound to be output at the sound emission timing corresponding to the operation button 6 is set through a clicking operation performed on the operation button 6, and the setting of the volume of the bass drum at the sound emission timing corresponding to the operation button 6 is changed through a dragging operation performed on the operation button 6, in this state.

Also, when a clicking operation is performed on the operation button 6, musical sound may be output using the tone parameter set using the operation button 6 with the tone selected in the tone selection area 9. In this manner, it is possible to try the tone selected in the tone selection area 9 at the sound emission timing corresponding to the operation button 6 before the automatic musical performance, and the user H can thus quickly and easily set the corresponding tone in a desired form of the user H through an operation of the parameter display part 6a in the operation button 6 based on the output musical sound.

As described above, whether or not to include the tone selected in the tone selection area 9 at each sound emission timing in the musical sound can be recognized at a glance by checking the emphasized display of the operation button 6 in the step musical performance mode. Also, it is possible to check the setting state of the tone parameter selected in the parameter selection area 10 through the parameter display part 6a in the operation button 6 and further to easily change the setting of the tone parameter through a dragging operation starting from the inside of the parameter display part 6a as a start point.

Also, since the state of the same tone parameter is displayed in the parameter display part 6a in each operation button 6, it is possible to recognize transitions of the tone parameter in a chronological order at a glance by checking the parameter display part 6a in the operation button 6 in the order of the sound emission timings. Therefore, it is possible to set the tone parameter of the corresponding sound emission timing while checking the setting state of the tone parameter through the parameter display part 6a in the operation button 6 at previous and following sound emission timings in a case in which the tone parameter is successively or periodically changed in a chronological order, and it is thus possible to easily set a tone parameter that changes in a chronological order.

In the step musical performance mode, the automatic musical performance is executed by performing the setting regarding whether or not to include a tone selected in the tone selection area 9 in the musical sound to be output and the setting of the tone parameter at each sound emission timing using the operation button 6 and outputting musical sound in accordance with the setting in order of the sound emission timings.

Figure 4:
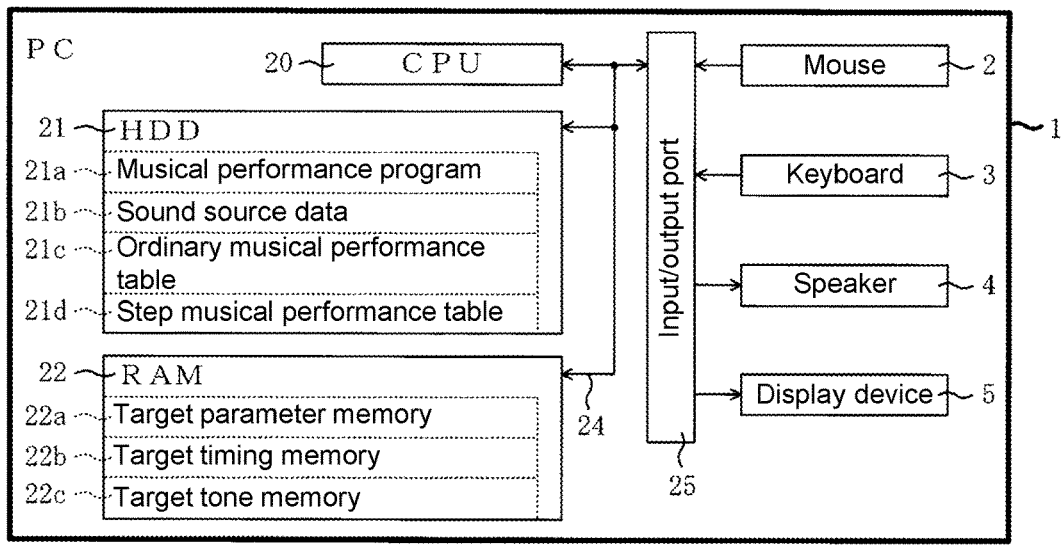
FIG. 4: (a) of FIG. 4 is a block diagram illustrating an electrical configuration of the PC, (b) of FIG. 4 is a diagram schematically illustrating an ordinary musical performance table, (c) of FIG. 4 is a diagram schematically illustrating a step musical performance table, and (d) of FIG. 4 is a diagram schematically illustrating parameters.

Next, an electrical configuration of the PC 1 will be described with reference to FIG. 4. (a) of FIG. 4 is a block diagram illustrating an electrical configuration of the PC 1. The PC 1 has a CPU 20, a hard disk drive (HDD) 21, and a RAM 22, and each of these is connected to an input/output port 24 via a bus line 23. The aforementioned mouse 2, the keyboard 3, the speaker 4, and the display device 5 are further connected to the input/output port 24.

Figure 5:
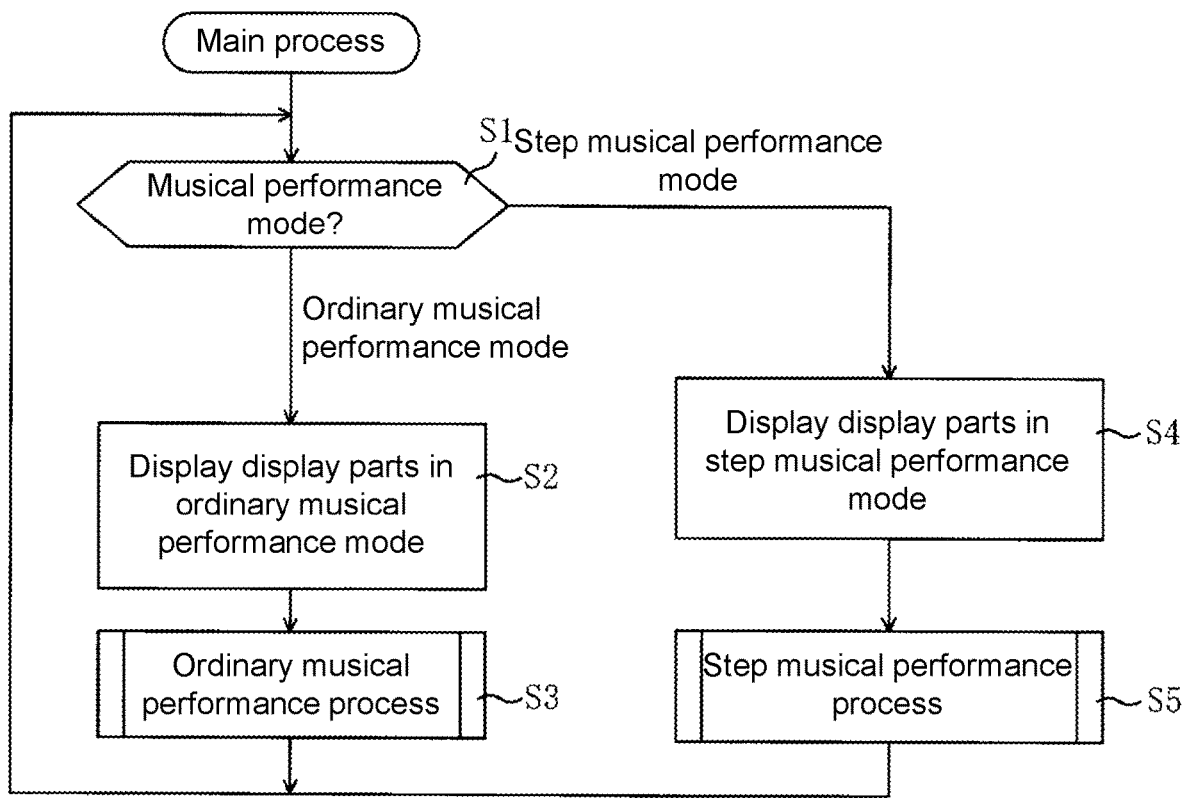
FIG. 5 is a flowchart of a main process.

The CPU 20 is an arithmetic operation device that controls each part connected via the bus line 23. The HDD 21 is a rewritable non-volatile storage device that stores programs to be executed by the CPU 20, fixed value data, and the like and stores a musical performance program 21a, sound source data 21b storing sound sources related to tones, an ordinary musical performance table 21c, and a step musical performance table 21d. If the CPU 20 executes the musical performance program 21a, then the main process in FIG. 5 is executed.

The ordinary musical performance table 21c is a data table that stores tones and tone parameters to be assigned to each operation button 6 in the ordinary musical performance mode while the step musical performance table 21d is a data table that stores settings regarding whether or not to include tones in musical sound to be output and tone parameters for each sound emission timing in the step musical performance mode. Referring to (b) to (d) of FIG. 4, the ordinary musical performance table 21c and the step musical performance table 21d will be described.

First, the ordinary musical performance table 21c will be described. (b) of FIG. 4 is a diagram schematically illustrating the ordinary musical performance table 21c. As illustrated in (b) of FIG. 4, the ordinary musical performance table 21c stores a tone to be assigned to each operation button 6 and a setting value of each tone parameter. In the ordinary musical performance table 21c, the case in which the "operation button" is "1" represents the operation button 6 at the left end in the upper row in (a) of FIG. 2, the case in which the "operation button" is "2" represents the second operation button 6 from the left in the upper row in (a) of FIG. 2, the cases in which the "operation button" is "3 to 5" represent the third to fifth operation buttons 6 from the left in the upper row in (a) of FIG. 2, respectively, and the cases in which the "operation button" is "6" to "10" represent the first to fifth operation buttons 6 from the left in the lower row.

Next, the step musical performance table 21d will be described. (c) of FIG. 4 is a diagram schematically illustrating the step musical performance table 21d, and (d) of FIG. 4 is a diagram schematically illustrating tone parameters P11. As illustrated in (c) of FIG. 4, the step musical performance table 21d is provided with tones (a bass drum, a snare drum, and the like) at each sound emission timing and stores settings regarding whether or not to include these tones in musical sound to be output (corresponding to "sound emission" in (c) of FIG. 4) and tone parameters for each tone.

In (c) of FIG. 4, a case in which a setting has been made to output a tone in the step musical performance table 21d is represented as "○" while a case in which a setting has been made not to output a tone is represented as "X". Regarding the tone parameters, setting values of the tone parameters such as a volume set for a corresponding sound emission timing and a tone are stored as the tone parameters P11 as in the case of the sound emission timing "1" and the tone "bass drum" illustrated in (d) of FIG. 4.

The RAM 22 is a memory that stores, in a rewritable manner, various kinds of work data, flags, and the like when the CPU 20 executes the musical performance program 21a and is provided with a target parameter memory 22a that stores a tone parameter as a setting target, a target timing memory 22b that stores a sound emission timing as a setting target, and a target tone memory 22c that stores a tone as a setting target.

Next, the main process executed by the CPU 20 in the PC 1 will be described with reference to FIG. 5 to FIG. 7. FIG. 5 is a flowchart of the main process. The main process is a process executed in a case in which a command to execute the musical performance program 21a is provided to the PC 1.

In the main process, a musical performance mode designated in a command from the user H via the mouse 2 or the keyboard 3 is checked first (S1). In a case in which the musical performance mode is the ordinary musical performance mode in the process in S1 (S1: ordinary musical performance mode), display parts in accordance with the ordinary musical performance mode are displayed on the display device 5 (S2). In this manner, the musical performance screen 5a in the ordinary musical performance mode illustrated in (a) of FIG. 2 is displayed on the display device 5. At this time, a setting state of a corresponding tone parameter in the ordinary musical performance table 21c is displayed in the parameter display part 6a in each operation button 6. After the process in S2, an ordinary musical performance process (S3) is executed. Referring to FIG. 6, the ordinary musical performance process will be described.

Figure 6:
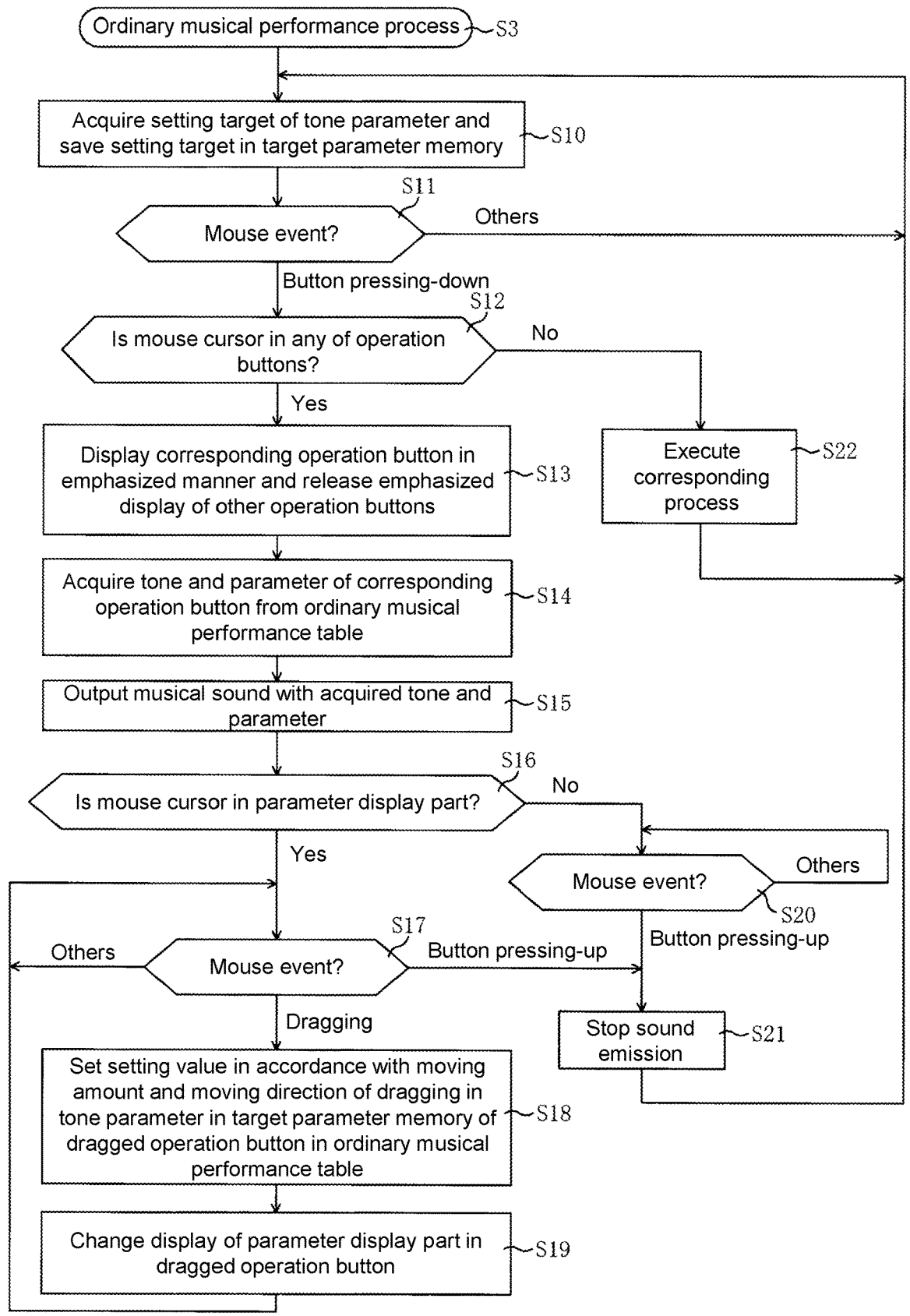
FIG. 6 is a flowchart of an ordinary musical performance process.

FIG. 6 is a flowchart of the ordinary musical performance process. The ordinary musical performance process is a process of outputting assigned musical sound and setting a tone parameter in accordance with an operation performed on the operation button 6 in the ordinary musical performance mode.

In the ordinary musical performance process, the tone parameter selected in the parameter selection area 7 in the musical performance screen 5a in (a) of FIG. 2 is saved in the target parameter memory 22a first (S10). After the process in S10, a mouse event is checked (S11). The mouse event is event information in accordance with an operation performed on the mouse 2, and "button pressing-down" in a case in which the button of the mouse 2 is pressed down, "button pressing-up" in a case in which the pressing-down of the button of the mouse 2 is released, and a "dragging operation" in a case in which a dragging operation of moving the mouse 2 with the button of the mouse 2 pressed down is performed are provided.

In a case in which the mouse event is button pressing-down in the process in S11 (S11: button pressing-down), whether the mouse cursor C (see (a) of FIG. 2) inside the musical performance screen 5a is located inside any of the operation buttons 6 is checked (S12). In a case in which the mouse cursor C is located in any of the operation button 6 in the process in S12 (S12: Yes), the operation button 6 where the mouse cursor C is located in the process in S12 is displayed in an emphasized manner, and emphasized display of the other operation buttons 6 is released (S13).

After the process in S13, a tone and tone parameters of the operation button 6 where the mouse cursor C is located are acquired from the ordinary musical performance table 21c (S14), and musical sound is output using the acquired tone and the tone parameters (S15). In this manner, the operation button 6 on which a clicking operation has been performed using the mouse 2 is displayed in an emphasized manner, and musical sound assigned to the operation button 6 is output.

After the process in S15, whether the mouse cursor C is inside the parameter display part 6a in the operation button 6 is checked (S16). In a case in which the mouse cursor C is inside the parameter display part 6a in the operation button 6 in the process in S16 (S16: Yes), a mouse event is checked (S17). Since a dragging operation of the mouse 2 or release of pressing-down of the button of the mouse 2 is assumed after the checking of the mouse event in the process in S11, a mouse event is checked again in the process in S17.

In a case in which the mouse event is a dragging operation in the process in S17 (S17: dragging), that is, in a case in which a dragging operation starting from the inside of the parameter display part 6a in the operation button 6 has been performed, a setting value in accordance with the moving amount and the moving direction of the dragging operation is set as the tone parameter in the target parameter memory 22a of the operation button 6, on which the dragging operation has been performed, in the ordinary musical performance table 21c (S18). After the process in S18, display of the parameter display part 6a in the operation button 6, on which the dragging operation has been performed, is changed in accordance with the setting value set in the ordinary musical performance table 21c in the process in S18 (S19).

In this manner, the setting value of the tone parameter in accordance with the moving amount and the moving direction of the dragging operation starting from the inside of the parameter display part 6a in the operation button 6 as a start point is set in the ordinary musical performance table 21c, and the display of the parameter display part 6a in the operation button 6 on which the dragging operation has been performed, is changed in accordance with the setting value.

In a case in which the mouse event is an event other than the dragging operation and button pressing-up in the process in S17 (S17: others), or after the process in S19, the process in and after S17 is repeated, and a further dragging operation of the mouse 2 or the release of the pressing-down of the button of the mouse 2 is waited for.

In a case in which the mouse cursor C is outside the parameter display part 6a in the operation button 6 in the process in S16 (S16: No), a mouse event is checked (S20). Since release of the pressing-down of the button of the mouse 2 is assumed after the checking of the mouse event in the process in S11, a mouse event is checked again in the process in S20.

In a case in which the mouse event is button pressing-up in the process in S20, that is, in a case in which the pressing-down of the button of the mouse 2 has been released (S20: button pressing-up), or in a case in which pressing-down of the button of the mouse 2 has been released in the process in S17 (S17: button pressing-up), the output of the musical sound started in the process in S15 is stopped (S21), and the process in and after S10 is repeated. Also, in a case in which the mouse event is an event other than the button pressing-up in the process in S20 (S20: others), the process in S20 is repeated, and the release of the pressing-down of the button of the mouse 2 is waited for.

In a case in which the mouse cursor C is located outside any of the operation buttons 6 in the process in S12 (S12: No), a process in accordance with the position of the mouse cursor C is performed (S22), and the process in and after S10 is performed. Also, in a case in which the mouse event is an event other than the button pressing-down in the process in S11 (S11: others), the process in and after S10 is performed.

Description will be returned to FIG. 5. In a case in which the musical performance mode is the step musical performance mode in the process in S1 (S1: step musical performance mode), display parts in accordance with the step musical performance mode are displayed on the display device 5 (S4). In this manner, the musical performance screen 5*a* in the step musical performance mode illustrated in FIG. 3 is displayed on the display device 5. At this time, a state regarding whether or not to include the tone selected in the tone selection area 9 in the musical sound to be output and the setting state of the tone parameter are acquired from the step musical performance table 21*d* and are displayed in the parameter display part 6*a* in each operation button 6. After the process in S4, a step musical performance process (S5) is executed. Referring to FIG. 7, the step musical performance process will be described.

Figure 7:
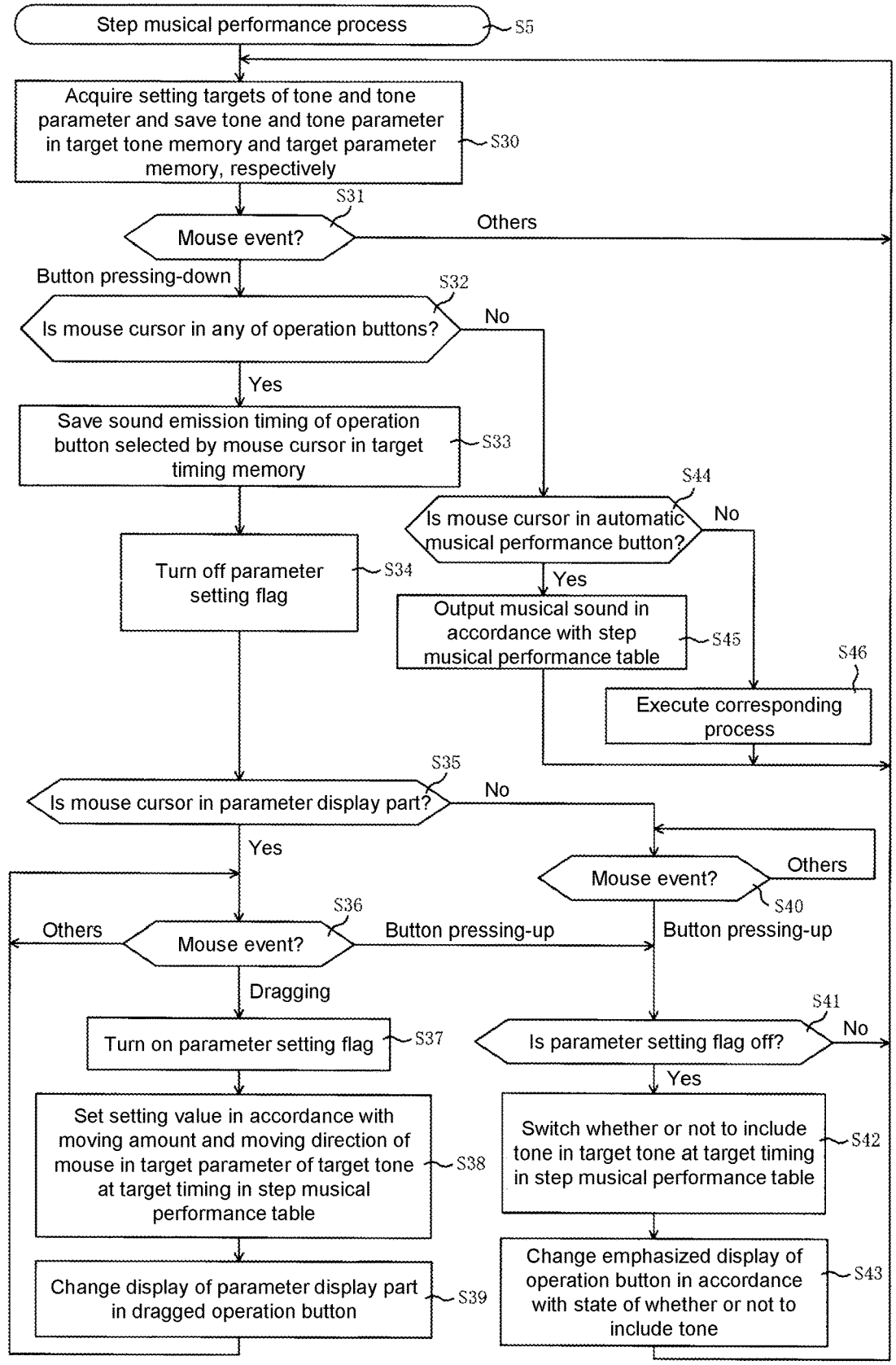
FIG. 7 is a flowchart of a step musical performance process.

FIG. 7 is a flowchart of the step musical performance process. The step musical performance process is a process in which the assigned tones and tone parameters are set in accordance with operations performed on the operation button 6 in the step musical performance mode and the step musical performance is performed.

In the ordinary musical performance process, the tone selected in the tone selection area 9 and the tone parameter selected in the parameter selection area 10 in the musical performance screen 5*a* in FIG. 3 are saved in the target tone memory 22*c* and the target parameter memory 22*a*, respectively, first (S30). Hereinafter, the tone in the target tone memory 22*c* saved in the process in S30 will be referred to as a "target tone", and the tone parameter in the target parameter memory 22*a* saved in the process in S30 will be referred to as a "target parameter".

After the process in S30, a mouse event is checked (S31). In a case in which the mouse event is button pressing-down in the process in S31 (S31: button pressing-down), whether the mouse cursor C is located inside any of the operation buttons 6 in the musical performance screen 5*a* is checked (S32).

In a case in which the mouse cursor C is located inside any of the operation buttons 6 in the process in S32 (S32: Yes), a sound emission timing corresponding to the operation button 6 where the mouse cursor C is located in the process in S32 is acquired and saved in the target timing memory 22*b* (S33). Hereinafter, the sound emission timing in the target timing memory 22*b* saved in the process in S33 will be referred to as a "target timing".

After the process in S33, a parameter setting flag that is a flag representing whether or not the parameter display part 6*a* in the operation button 6 is being operated is set to OFF through a dragging operation using the mouse 2 (S34). After the process in S34, whether the mouse cursor C is inside the parameter display part 6*a* in the operation button 6 is checked (S35). In a case in which the mouse cursor C is inside the parameter display part 6*a* in the operation button 6 in the process in S35 (S35: Yes), a mouse event is checked (S36). Since a dragging operation of the mouse 2 or release of pressing-down of the button of the mouse 2 is assumed after the checking of the mouse event in the process in S31, the mouse event is checked again similarly to the ordinary musical performance process in FIG. 6.

In a case in which the mouse event is a dragging operation in the process in S36 (S36: dragging), that is, in a case in which a dragging operation starting from the inside of the parameter display part 6*a* in the operation button 6 as a start point has been performed, the parameter setting flag is set to ON (S37), and a setting value in accordance with the moving amount and the moving direction of the dragging operation is set in the target parameter of the target tone at the target timing in the step musical performance table 21*d* (S38).

After the process in S38, the display of the parameter display part 6*a* in the operation button 6, on which the dragging operation has been performed, is changed in accordance with the setting value set in the step musical performance table 21*d* in the process in S38 (S39). In this manner, the setting value of the tone parameter in accordance with the moving amount and the moving direction of the dragging operation performed on the parameter display part 6*a* in the operation button 6 is set in the step musical performance table 21*d*, and the display of the parameter display part 6*a* in the operation button 6, on which the dragging operation has been performed, is changed in accordance with the setting value.

In a case in which the mouse event is an event other than the dragging operation and the button pressing-up in the process in S36 (S36: others), or after the process in S39, the process in and after S36 is repeated, and a further dragging operation of the mouse 2 or release of the pressing-down of the button of the mouse 2 is waited for.

In a case in which the mouse cursor C is outside the parameter display part 6*a* in the operation button 6 in the process in S35 (S35: No), a mouse event is checked (S40). In a case in which the mouse event is button pressing-up in the process in S40 (S40: button pressing-up), or in a case in which the mouse event is button pressing-up in the process in S36 (S36: button pressing-up), whether OFF has been set in the parameter setting flag is checked (S41). In a case in which the parameter setting flag is OFF in the process in S41 (S41: Yes), it is determined that although the pressing-down of the button of the mouse 2 has been detected in the process in S32, a dragging operation starting from the inside of the parameter display part 6*a* as a start point has not been performed, and the pressing-down of the button of the mouse 2 has been released as it is.

In such a case, since it is possible to determine that an operation for setting whether or not to include the target tone at the sound emission timing corresponding to the operation button 6 in the musical sound to be output has been performed, whether or not to include the target tone at the target timing in the step musical performance table 21*d* is switched (S42).

After the process in S42, emphasized display of the operation button 6 corresponding to the target tone at the target timing in the step musical performance table 21*d*, which has been switched in the process in S42, is switched (S43). In other words, the operation button 6 corresponding to the sound emission timing and the tone set to be included using the step musical performance table 21*d* in the process in S42 is displayed in an emphasized manner, and emphasized display of the operation button 6 corresponding to the sound emission timing and the tone set not to be included is released.

In this manner, whether or not to include the sound selected in the tone selection area 9 at the sound emission timing corresponding to the operation button 6 is switched in accordance with a clicking operation performed on the operation button 6 using the mouse 2, and the setting state is reflected to whether or not to display the operation button 6 in an emphasized manner.

In a case in which the mouse event is an event other than the button pressing-up in the process in S40 (S40: others), the process in S40 is repeated, and release of the pressing-down of the button of the mouse 2 is waited for.

In a case in which the mouse cursor C is located outside any of the operation button 6 in the process in S32 (S32:

No), whether the mouse cursor C is located inside the automatic musical performance button 11 is further checked (S44). In a case in which the mouse cursor C is located inside the automatic musical performance button 11 in the process in S44 (S44: Yes), it is possible to determine that the automatic musical performance button 11 has been operated, musical sound is thus output in accordance with the sound emission timing and the tone parameter set in the step musical performance table 21d, and the automatic musical performance is executed (S45). On the other hand, in a case in which the mouse cursor C is located outside the automatic musical performance button 11 (S44: No), a process in accordance with the position of the mouse cursor C is performed (S46).

In a case in which the mouse event is an event other than the button pressing-down in the process in S31 (S31: others), in a case in which the parameter setting flag is ON in the process in S41 (S41: No), or after the processes in S43, S45, and S46, the process in and after S30 is repeated.

Description will be returned to FIG. 5. After the ordinary musical performance process in S3 or the step musical performance process in S5, the process in and after S1 is repeated.

As described above, the musical sound assigned through clicking of the operation button 6 is output, and the setting of the tone parameter of the operation button 6 is changed through a dragging operation starting from the inside of the parameter display part 6a as a start point, in the ordinary musical performance mode according to the present embodiment. Since the parameter display part 6a is displayed in the operation button 6, the user H can recognize the state of the tone parameter of the musical sound to be output in advance by checking the parameter display part 6a in the operation button 6 on which the clicking operation is performed when the musical sound is output.

Further, since the tone parameter set through the dragging operation starting from the inside of the parameter display part 6a is displayed in the parameter display part 6a in the operation button 6, it is possible to change the tone parameter while recognizing the setting state of the tone parameter without looking away from the operation button 6. In this manner, it is possible to improve operability of the operation button 6 even in a case in which the function of outputting musical sound and the function of changing a tone parameter of the musical sound are assigned thereto.

Also, in the step musical performance mode according to the present embodiment, the operation button 6 corresponding to each sound emission timing is displayed. Then, the setting of the tone parameter at the corresponding sound emission timing is changed through a dragging operation starting from the inside of the parameter display part 6a in the operation button 6 as a start point, and the changed setting state of the tone parameter is displayed in the parameter display part 6a. In this manner, it is possible to easily set the tone parameter and to check the setting state of the tone parameter at each sound emission timing at a glance through the operation button 6 at each sound emission timing in the step musical performance.

Also, since a desired tone parameter can be set through an intuitive operation for changing the setting of the tone parameter, which is the dragging operation starting from the inside of the parameter display part 6a as a start point, it is possible to further improve the operability of the operation button 6.

Although the above description has been made on the basis of the above embodiment, it is possible to easily infer that various improvements and modifications can be made.

In the above embodiment, the operation buttons 6 are displayed in rectangular shapes. However, the shapes of the operation buttons 6 are not limited to the rectangular shapes and may be polygonal shapes such as triangular shapes or pentagonal shapes, circular shapes, or other shapes. For example, the shape of each operation button 6 may be a shape that simulates an actual instrument (a bass drum or a cymbal) that emits sound of the assigned tone as the operation button 60 displayed in the musical performance screen 50a in (a) of FIG. 8, and the parameter display part 60a may be displayed inside the operation button 60. In this manner, the user H can recognize the operation button 60 assigned with the tone that the user H desires to output or the tone parameter for which the user desires to change the setting at a glance.

In the above embodiment, the parameter display part 6a is displayed with different forms in the first area 6a4 from the left end part 6a1 to the current position 6a3 and the second area 6a5 from the current position 6a3 to the right end part 6a2 in (b) and (c) of FIG. 2. However, the disclosure is not limited thereto, the area from the upper most part 61a6 of the parameter display part 61a to the current position 61a3 may be defined as the first area 61a4, and the area outside the first area 61a4 in the parameter display part 61a may be defined as the second area 61a5, as in an operation button 61 in (b) of FIG. 8, and the first area 61a4 and the second area 61a5 may be displayed in different forms. By defining the uppermost part 61a6 as a reference value of the tone parameter, it is possible to recognize the deviation amount between the reference value of the tone parameter and the current setting value of the tone parameter corresponding to the current position 61a3 at a glance through checking of the length of the first area 61a4.

In the above embodiment, the parameter display part 6a is formed into a circular shape. However, the disclosure is not limited thereto, and a parameter display part 62a may be formed in to a bar shape as the parameter display part 62a in an operation button 62 in (c) of FIG. 8 or may be formed into another shape such as a step shape, a polygonal shape, or a spiral shape.

Figure 8:
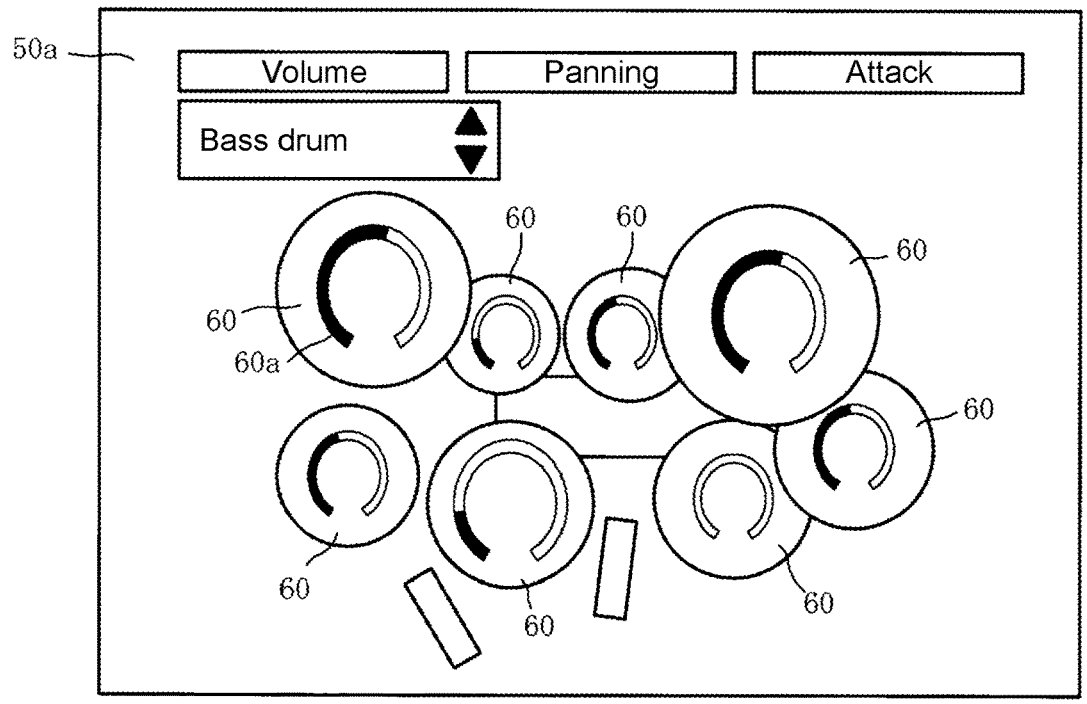
FIG. 8: (a) of FIG. 8 is a diagram representing a case in which a musical instrument that emits sound of an operation button is simulated according to a modification example, (b) of FIG. 8 is a diagram representing a parameter display part in a case in which an area from a top part to a current position of the parameter display part is defined as a first area according to the modification example, (c) of FIG. 8 is a diagram representing a case in which the parameter display part is caused to have a bar shape according to the modification example, (d) of FIG. 8 is a diagram representing a case in which two parameter display parts are disposed in one operation button according to the modification example, and (e) of FIG. 8 is a diagram representing a case in which the parameter display part and a setting value are present according to the modification example.
Figure 8:
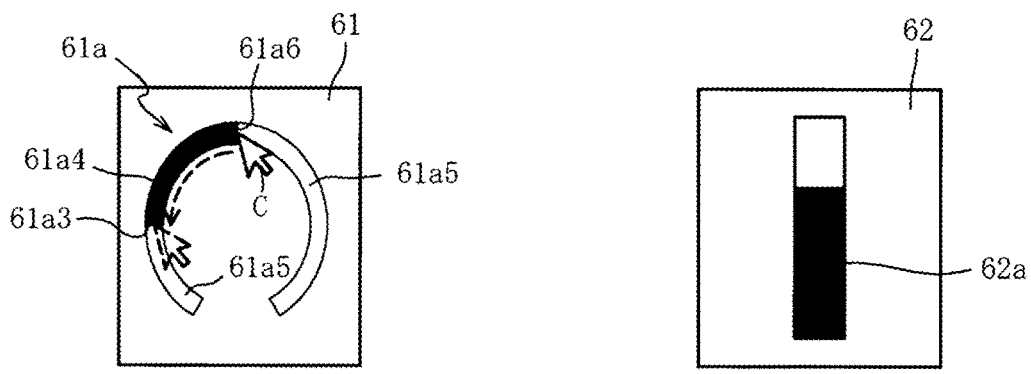
Figure 8:
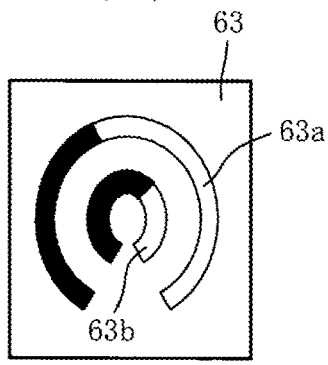
Figure 8:
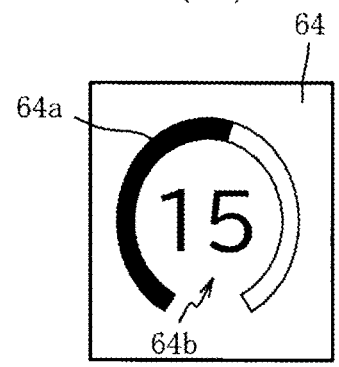

Also, although one parameter display part 6a is displayed in one operation button 6 in the above embodiment, the disclosure is not limited thereto, and two parameter display parts 63a and 63b may be displayed as in an operation button 63 in (d) of FIG. 8, for example. In this case, it is only necessary to assign different tone parameters to the parameter display part 63a and the parameter display part 63b, to display setting states of the corresponding tone parameters in the parameter display parts 63a and 63b, and to set the corresponding tone parameters through dragging operations performed on the parameter display parts 63a and 63b.

Also, a location where the setting state of the tone parameter is displayed in the operation button 6 is not limited to the parameter display part 6a, and a setting value area 64b that displays a parameter value displayed in the parameter display part 64a with a numerical value may be displayed in the operation button 64 in addition to the parameter display part 64a as an operation button 64 in (e) of FIG. 8, for example. In this manner, the setting state of the tone parameter is also displayed as a numerical value in the setting value area 64b in addition to the parameter display part 64a illustrating the tone parameter, and the user H can thus more accurately and easily recognize the setting state of the tone parameter.

According to the above embodiment, the musical sound assigned to the operation button 6 is output in the ordinary musical performance mode, and whether or not to include the tone selected in the tone selection area 9 at the sound emission timing of the operation button 6 in the musical sound to be output is switched in the step musical performance mode, through a clicking operation performed on the operation button 6. However, such commands for the operation button 6 are not limited to the clicking operation and may be a double clicking operation or another operation. In this case, the command is preferably based on an operation scheme that is different from the operation scheme (the dragging operation in the above embodiment) for the parameter display part 6a in the operation button 6.

In the above embodiment, a change in setting of the tone parameter is executed through a dragging operation starting from the inside of the parameter display part 6a in the operation button 6. However, the disclosure is not limited thereto, and the parameter display part 6a may be changed in accordance with a dragging operation in the operation button 6, in particular, at an arbitrary position outside the parameter display part 6a. In this case, the setting of the tone parameter may be changed only in a case in which the dragging operation is performed in a specific direction (an oblique direction, for example).

Also, the changing of the setting of the tone parameter is not limited to the dragging operation using the mouse 2, and the setting of the tone parameter may be changed through an operation performed on a scroll wheel (not illustrated) of the mouse 2, for example. At this time, it is only necessary to operate the scroll wheel of the mouse 2 in a state in which the mouse cursor C is located on the operation button 6 and to change the setting of the tone parameter assigned to the operation button 6 in accordance with the moving amount and the moving direction of the operated scroll wheel.

Although the ten operation buttons 6 are displayed in the ordinary musical performance mode in the above embodiment, the disclosure is not limited thereto, and the number of the operation buttons 6 may be ten or more or ten or less. Also, although the sixteen operation buttons 6 are displayed in the step musical performance mode, the disclosure is not limited thereto, and the number of the operation buttons 6 may be sixteen or more or sixteen or less in accordance with the number of sound emission timings at which automatic musical performance is performed.

Although the PC 1 has been exemplified as the computer that executes the musical performance program 21a in the above embodiment, the disclosure is not limited thereto, and the musical performance program 21a may be executed by an information processing device such as a smartphone or a tablet terminal or an electronic musical instrument. In this case, it is only necessary to provide a touch panel instead of the mouse 2 and the keyboard 3 in an superimposed manner on the display device 5, to perform an output and the like of musical sound assigned to an operation button 6 through a touching operation or a tapping operation (first operation) performed on the operation button 6 displayed on the display device 5 and the touch panel, and to perform the changing and the like of the setting of the corresponding tone parameter through a flicking operation or a swiping operation (second operation) performed on the parameter display part 6a in the operation button 6. Also, the disclosure maybe applied to a dedicated device (musical performance device) that executes only the musical performance program 21a with the musical performance program 21a stored in a ROM or the like.

The numerical values exemplified in the above embodiment are just examples, and it is a matter of course that other numerical values can be employed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A musical performance device comprising:
a display section that displays an operation button;
an input section to which an operation of a user is input;
an output section that outputs a musical sound assigned to the operation button through a first operation input to the operation button using the input section;
a changing section that changes a tone parameter of the musical sound assigned to the operation button through a second operation that is different from the first operation input to the operation button using the input section; and
a parameter display section that displays, inside the operation button, the tone parameter of the musical sound assigned to the operation button.

2. The musical performance device according to claim 1, wherein a parameter display part on which the tone parameter of the musical sound assigned to the operation button is displayed is provided inside the operation button, and
in the changing section, the tone parameter of the musical sound assigned to the operation button is changed in a case in which the second operation is performed inside the parameter display part of the operation button.

3. The musical performance device according to claim 2, wherein in the parameter display section, a shape of the parameter display part of the operation button is displayed in an arc shape.

4. The musical performance device according to claim 1, wherein the tone parameter is provided with a plurality of types of tone parameters,
the musical performance device further comprises a parameter selecting section that selects the tone parameter of musical sound set in the operation button,
in the changing section, the tone parameter selected in the parameter selecting section which is the tone parameter of the musical sound assigned to the operation button on which the second operation has been performed is changed, and
in the parameter display section, the tone parameter selected in the parameter selecting section which is the tone parameter of the musical sound assigned to the operation button is displayed inside the operation button.

5. The musical performance device according to claim 1, wherein the second operation is a dragging operation performed on the operation button, and
in the changing section, the tone parameter of the musical sound assigned to the operation button is changed in accordance with a moving amount and a moving direction of the dragging operation performed on the operation button.

6. The musical performance device according to claim 1, wherein in the parameter displaying section, the operation button is displayed with a shape that simulates an actual musical instrument that emits the musical sound to which the operation button is assigned.

7. The musical performance device according to claim 1, further comprising:

a step performing section that performs a step musical performance of outputting the musical sound for each predetermined sound emission timing, wherein in the parameter displaying section, the operation button corresponding to each sound emission timing of the step musical performance is displayed, in the changing section, the tone parameter of the musical sound output at a sound emission timing corresponding to the operation button, on which the second operation has been performed, is changed, and in the parameter displaying section, the tone parameter of the musical sound output at the sound emission timing corresponding to the operation button is displayed inside the operation button.

8. An non-transitory computer readable storage medium storing a musical performance program that causes a computer provided with a display part and an input part that receives an operation of a user to execute a musical performance process, the musical performance program causing the computer to execute:

a displaying step of displaying an operation button on the display part;

an inputting step of inputting the operation of the user from the input part;

an outputting step of outputting a musical sound assigned to the operation button through a first operation input to the operation button in the inputting step of the operation;

a changing step of changing a tone parameter of the musical sound assigned to the operation button through a second operation that is different from the first operation input to the operation button in the inputting step of the operation; and a parameter displaying step of displaying, inside the operation button, the tone parameter of the musical sound assigned to the operation button.

9. The non-transitory computer readable storage medium according to claim 8, wherein a parameter display part on which the tone parameter of the musical sound assigned to the operation button is displayed is provided inside the operation button, and in the changing step of the tone parameter, the tone parameter of the musical sound assigned to the operation button is changed in a case in which the second operation is performed inside the parameter display part of the operation button.

10. The non-transitory computer readable storage medium according to claim 9, wherein in the parameter displaying step of the tone parameter, a shape of the parameter display part of the operation button is displayed in an arc shape.

11. The non-transitory computer readable storage medium according to claim 8, wherein the tone parameter is provided with a plurality of types of tone parameters, the computer is further caused to execute a parameter selecting step of selecting the tone parameter of musical sound set in the operation button, in the changing step of the tone parameter, the tone parameter selected in the parameter selecting step of the tone parameter of the musical sound assigned to the operation button on which the second operation has been performed is changed, and in the parameter displaying step of the tone parameter, the tone parameter selected in the parameter selecting step of the tone parameter of the musical sound assigned to the operation button is displayed inside the operation button.

12. The non-transitory computer readable storage medium according to claim 8, wherein the second operation is a dragging operation performed on the operation button, and in the changing step of the tone parameter, the tone parameter of the musical sound assigned to the operation button is changed in accordance with a moving amount and a moving direction of the dragging operation performed on the operation button.

13. The non-transitory computer readable storage medium according to claim 8, wherein in the parameter displaying step of the tone parameter, the operation button is displayed with a shape that simulates an actual musical instrument that emits the musical sound to which the operation button is assigned.

14. The non-transitory computer readable storage medium according to claim 8, further causing the computer to execute:

a step performing step of performing a step musical performance of outputting the musical sound for each predetermined sound emission timing, wherein in the parameter displaying step of the tone parameter, the operation button corresponding to each sound emission timing of the step musical performance is displayed, in the changing step of the tone parameter, the tone parameter of the musical sound output at a sound emission timing corresponding to the operation button, on which the second operation has been performed, is changed, and in the parameter displaying step of the tone parameter, the tone parameter of the musical sound output at the sound emission timing corresponding to the operation button is displayed inside the operation button.

* * * * *